US011838570B2

(12) United States Patent
Jo et al.

(10) Patent No.: US 11,838,570 B2
(45) Date of Patent: Dec. 5, 2023

(54) LOUDNESS NORMALIZATION METHOD AND SYSTEM

(71) Applicants: NAVER CORPORATION, Seongnam-si (KR); GAUDIO LAB, INC., Seoul (KR)

(72) Inventors: Seongcheol Jo, Seongnam-si (KR); Taek Su An, Seongnam-si (KR); Sung Hyun Kang, Seongnam-si (KR); JiUng Lee, Seongnam-si (KR); Byung Gyou Choi, Seongnam-si (KR); Jeongsoo Hur, Seongnam-si (KR); Hyeonsu Seo, Seoul (KR); Taegyu Lee, Seoul (KR); Hyun Oh Oh, Seongnam-si (KR)

(73) Assignees: NAVER CORPORATION, Seongnam-si (KR); GAUDIO LAB, INC., Seoul (KR)

(*) Notice: Subject to any disclaimer, the term of this patent is extended or adjusted under 35 U.S.C. 154(b) by 8 days.

(21) Appl. No.: 17/653,145

(22) Filed: Mar. 2, 2022

(65) Prior Publication Data
US 2022/0264160 A1    Aug. 18, 2022

Related U.S. Application Data

(63) Continuation of application No. PCT/KR2020/011680, filed on Sep. 1, 2020.

(30) Foreign Application Priority Data

Sep. 2, 2019    (KR) ........................ 10-2019-0108360

(51) Int. Cl.
*H04N 21/23*    (2011.01)
*H04N 21/2387*    (2011.01)
(Continued)

(52) U.S. Cl.
CPC ....... *H04N 21/2387* (2013.01); *H04N 21/233* (2013.01); *H04N 21/237* (2013.01); *H04N 21/4532* (2013.01)

(58) Field of Classification Search
CPC ............. H04N 21/2387; H04N 21/233; H04N 21/237; H04N 21/4532; H04N 21/23106;
(Continued)

(56) References Cited

U.S. PATENT DOCUMENTS 8,151,295 B1 *    4/2012    Eldering ........... H04N 21/44016
725/35
11,336,928 B1 *    5/2022    Thornberry ....... H04N 21/23418
(Continued)

FOREIGN PATENT DOCUMENTS

KR        100677634 B1      1/2007
KR       1020100001200 A    1/2010
(Continued)

OTHER PUBLICATIONS

Search report issued in PCT/KR2020/011680 dated Nov. 25, 2020.

*Primary Examiner* — Timothy R Newlin
(74) *Attorney, Agent, or Firm* — Greer Burns & Crain Ltd.

(57) ABSTRACT

A loudness normalization method includes receiving data for playback of content from a server in response to a user's request to play back the content; normalizing the loudness of the content by adjusting the volume output level of a player using volume level metadata of the content included in the received data; and providing the content by playing audio of the content based on the adjusted volume output level of the player.

10 Claims, 10 Drawing Sheets

(51) Int. Cl.
*H04N 21/233* (2011.01)
*H04N 21/237* (2011.01)
*H04N 21/45* (2011.01)

(58) Field of Classification Search
CPC ........... H04N 21/2743; H04N 21/4852; H04N 21/812; H04N 21/4394; H04N 21/6547; H04N 21/6581; G06F 16/683
See application file for complete search history.

(56) References Cited

U.S. PATENT DOCUMENTS

| | | | | |
|---|---|---|---|---|
| 2009/0019364 | A1* | 1/2009 | Cho | G06F 16/48 715/273 |
| 2009/0110373 | A1* | 4/2009 | Aoyagi | H04N 5/60 386/353 |
| 2010/0109926 | A1* | 5/2010 | Medina | H03G 3/3005 386/338 |
| 2010/0161585 | A1* | 6/2010 | Jin | G06F 3/0607 707/E17.014 |
| 2012/0189135 | A1* | 7/2012 | Nabeshima | H04N 21/2747 381/74 |
| 2013/0128119 | A1* | 5/2013 | Madathodiyil | H04N 21/4751 348/563 |
| 2013/0167182 | A1* | 6/2013 | Lee | H04N 21/4826 725/100 |
| 2015/0128158 | A1* | 5/2015 | Wheatley | H04N 21/44218 725/12 |
| 2016/0005404 | A1* | 1/2016 | Yokoya | H04N 21/42203 704/275 |
| 2016/0044387 | A1* | 2/2016 | Zucchetta | H04N 21/8126 725/32 |
| 2016/0065160 | A1* | 3/2016 | Choi | H03G 9/025 381/107 |
| 2017/0094409 | A1* | 3/2017 | Baumgarte | G10L 19/00 |
| 2017/0223429 | A1* | 8/2017 | Schreiner | H04N 21/44222 |
| 2017/0249950 | A1* | 8/2017 | Hoerich | G10L 19/167 |
| 2017/0374423 | A1* | 12/2017 | Anderson | H04N 21/4532 |
| 2019/0261046 | A1* | 8/2019 | Hiremath | H04N 21/84 |
| 2022/0256233 | A1* | 8/2022 | Grover | H04N 21/4852 |

FOREIGN PATENT DOCUMENTS

| | | |
|---|---|---|
| KR | 1020130084350 A | 7/2013 |
| KR | 1020180087782 A | 8/2018 |
| KR | 1020180092664 A | 8/2018 |

* cited by examiner

LOUDNESS NORMALIZATION METHOD AND SYSTEM

CROSS-REFERENCE TO RELATED APPLICATIONS

This is a continuation application of International Application No. PCT/KR2020/011680, filed Sep. 1, 2020, which claims the benefit of Korean Patent Application No. 10-2019-0108360, filed Sep. 2, 2019.

BACKGROUND OF THE INVENTION

Field of Invention

The following description relates to a loudness normalization method and system.

Description of Related Art

There are services in which content including audio is delivered over a network to be listened to or watched (e.g., music or video streaming services). For example, Korean Laid-Open Patent No. 10-2016-0083675 discloses a live streaming content delivery method, in which live streaming content can be delivered faster without delay by pre-caching live streaming content consisting of a plurality of chunk files, except for the first chunk file, ahead of time before a terminal makes a request for it.

In this instance, there may be volume differences between different items of content. For example, after a first item of content with a first loudness level is listened to or watched, a second item of content with a second loudness level may be played back. In this case, if the second level is much higher or lower than the first level, the user may have to take the trouble of adjusting the volume or be uncomfortable with the volume being too high (or too low). In other words, the user may experience a poor quality of service due to such a volume difference between different items of content.

As a conventional technology for solving this problem, there is a technology in which, when content to be delivered from a server to a client is transcoded, the loudness of the content is adjusted to bring the volume of the content to a proper level for broadcasting (e.g., −24 LUFS (loudness units relative to full scale)). However, this conventional technology may have the following problems:

(1) Adjusting volume when transcoding content such as video may damage the dynamic band or disrupt the original intention of the creator.
(2) Changing the volume level upward or downward incurs cost in transcoding the entire content over again.
(3) It is not possible to optimize to different volume levels according to the characteristics of various client environments (platforms, devices, sound output systems (speakers), etc.) in which the content is played back.
(4) Volume level adjustment and control through transcoding are not basically allowed for external content (e.g., advertisement content) which is streamed to a client from a system external to the server.

BRIEF SUMMARY OF THE INVENTION

The present disclosure provides a loudness normalization method and system that can play back content at a normalized loudness by optimizing the volume level of the content to a player for playing back the content, in a process of preparing for the playback of the content on a client.

An exemplary embodiment of the present disclosure provides a loudness normalization method for a computer device comprising at least one processor, the loudness normalization method comprising: receiving, by the at least one processor, data for playback of content from a server in response to a user's request to play back the content; normalizing, by the at least one processor, the loudness of the content by adjusting the volume output level of a player using volume level metadata of the content comprised in the received data; and providing, by the at least one processor, the content by playing audio of the content based on the adjusted volume output level of the player.

According to one aspect, the loudness normalization method may further comprise: receiving, by the at least one processor, external content related to the content from an external server; receiving, by the at least one processor, volume level metadata of the external content from the server, based on the presence of a playback history of the external content; normalizing, by the at least one processor, the loudness of the external content by adjusting the volume output level of the player using the received volume level metadata of the external content; and providing, by the at least one processor, the external content by playing audio of the external content based on the adjusted volume output level of the player.

According to another aspect, the loudness normalization may comprise: receiving, by the at least one processor, external content related to the content from an external server; extracting, by the at least one processor, volume level metadata from the external content, based on the absence of a playback history of the external content; transmitting, by the at least one processor, the extracted volume level metadata to the server so that the extracted volume level metadata is stored in the server; normalizing, by the at least one processor, the loudness of the external content by adjusting the volume output level of the player using the extracted volume level metadata; and providing, by the at least one processor, the external content by playing audio of the external content based on the adjusted volume output level of the player.

According to yet another aspect, the volume level metadata may comprise a plurality of band-specific loudness values based on which the entire frequency band of the audio is divided into preset frequency ranges, and the normalizing of the loudness may comprise adjusting the volume output level of the player for each frequency band based on the loudness values for the different bands comprised in the volume level metadata of the content.

An exemplary embodiment of the present disclosure provides a loudness normalization method for a computer device comprising at least one processor, the loudness normalization method comprising: receiving, by the at least one processor, a file of content uploaded from a first user; extracting, by the at least one processor, content metadata and volume level metadata from the content; storing, by the at least one processor, the extracted content metadata, the extracted volume level metadata, and the file of the content in a database; and providing, by the at least one processor, the content metadata and file of the content for playback, in response to a content request from a second user, and further providing the volume level metadata of the content so as to adjust the volume output level of a player of the second user.

An exemplary embodiment of the present disclosure provides a computer program stored in a computer-readable recording medium coupled to a computer device to execute the above loudness normalization method in the computer device:

An exemplary embodiment of the present disclosure provides a computer-readable recording medium with a computer program recorded therein to execute the above loudness normalization method in a computer device.

An exemplary embodiment of the present disclosure provides a computer device comprising at least one processor implemented to execute a computer-readable instruction, the at least one processor being configured to receive data for playback of content from a server in response to a user's request to play back the content, normalize the loudness of the content by adjusting the volume output level of a player using volume level metadata of the content comprised in the received data, and provide the content by playing audio of the content based on the adjusted volume output level of the player.

An exemplary embodiment of the present disclosure provides a computer device comprising at least one processor implemented to execute a computer-readable instruction, the at least one processor being configured to receive a file of content uploaded from a first user, to extract content metadata and volume level metadata from the content, to store the extracted content metadata, the extracted volume level metadata, and the file of the content in a database, and to provide the content metadata and file of the content for playback, in response to a content request from a second user and further provide the volume level metadata of the content so as to adjust the volume output level of a player of the second user.

It is possible to play back content at a normalized loudness by optimizing the volume level of the content to a player for playing back the content, in a process of preparing for the playback of the content on a client.

In this case, there is no need for the server to adjust the volume of the content through transcoding, thereby preventing a reduction in dynamic band or a disruption of the original intention of the creator. Moreover, the cost incurred in transcoding the entire content over again may be avoided. In addition, it is possible to optimize to different volume levels according to the characteristics of various client environments (platforms, devices, sound output systems (speakers), etc.) in which the content is played back. Furthermore, volume level adjustment and control through transcoding are allowed for external content (e.g., advertisement content) which is streamed to a client from a system external to the server.

DETAILED DESCRIPTION OF THE INVENTION

Hereinafter, an embodiment will be described in detail with reference to the accompanying drawings.

A loudness normalization system according to embodiments of the present disclosure maybe implemented by at least one computer device, and a loudness normalization method according to embodiments of the present disclosure may be performed by at least one computer device included in the loudness normalization system. A computer program according to an embodiment of the present disclosure may be installed and run on the computer device. The computer device may perform a method according to embodiments of the present disclosure under the control of a running computer program. The above computer program may be stored in a computer-readable recording medium coupled to the computer device to execute the method in the computer.

Figure 1:
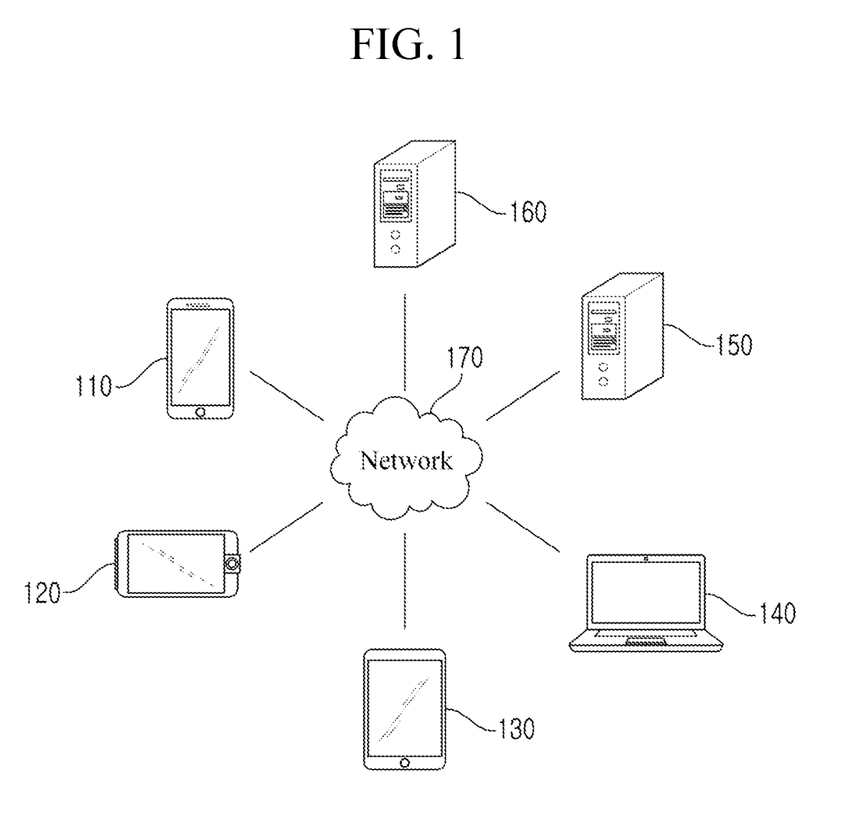
FIG. 1 is a diagram illustrating an example of a network environment according to an embodiment of the present disclosure.

FIG. 1 is a view illustrating an example of a network environment according to an embodiment of the present disclosure. The network environment of FIG. 1 includes a plurality of electronic devices 110, 120, 130, and 140, a plurality of servers 150 and 160, and a network 170. FIG. 1 is only an example for describing the present disclosure, and the number of electronic devices or the number of servers is not limited to what is shown in FIG. 1. Also, the network environment of FIG. 1 is only an example of environments applicable to embodiments of the present disclosure, and the environments applicable to embodiments of the present disclosure are not limited to the network environment of FIG. 1.

The plurality of electronic devices 110, 120, 130, 140 may be stationary terminals or mobile terminals that are implemented by a computer device. Examples of the plurality of electronic devices 110, 120, 130, 140 may include a smart phone, a cellular phone, a navigation device, a computer, a laptop, a digital broadcasting terminal, a personal digital assistant (PDA), a portable multimedia player (PMP), a tablet PC, etc. Although FIG. 1 shows an image of a smartphone as an example of the electronic device 110, the electronic device 110 in the embodiments of the present disclosure may refer to one of various physical computer systems capable of substantially communicating with the other electronic devices 120, 130, and 140, and/or the servers 150 and 160 over the network 170, by using a wireless or wired communication method.

The method of communication is not particularly limited, and may include short-distance wireless communication between devices, as well as communications using a communication network (e.g., a mobile communication network, wired Internet, wireless Internet, and a broadcasting network) which the network 170 may include. For example, the network 170 may include one or more networks, including a personal area network (PAN), a local area network (LAN), a campus area network (CAN), a metropolitan area network (MAN), a wide area network (WAN), a broadband network (BBN), and the Internet. Also, the network 170 may include, but not limited to, one or more network topologies, including a bus network, a star network, a ring network, a mesh network, a star-bus network, a tree or hierarchical network, and the like.

Each of the servers 150 and 160 may be configured as a computer device or a plurality of computer devices that provide instructions, code, files, content, services, and the like through communication with the plurality of electronic devices 110, 120, 130, and 140 over the network 170. For example, the server 150 may be a system that provides service (e.g., a group call service (or a voice conference service), a messaging service, a mail service, a social networking service, a map service, a translation service, a financial service, a payment service, a search service, and a content delivery service) to the plurality of electronic devices 110, 120, 130, and 140 connected through the network 170.

Figure 2:
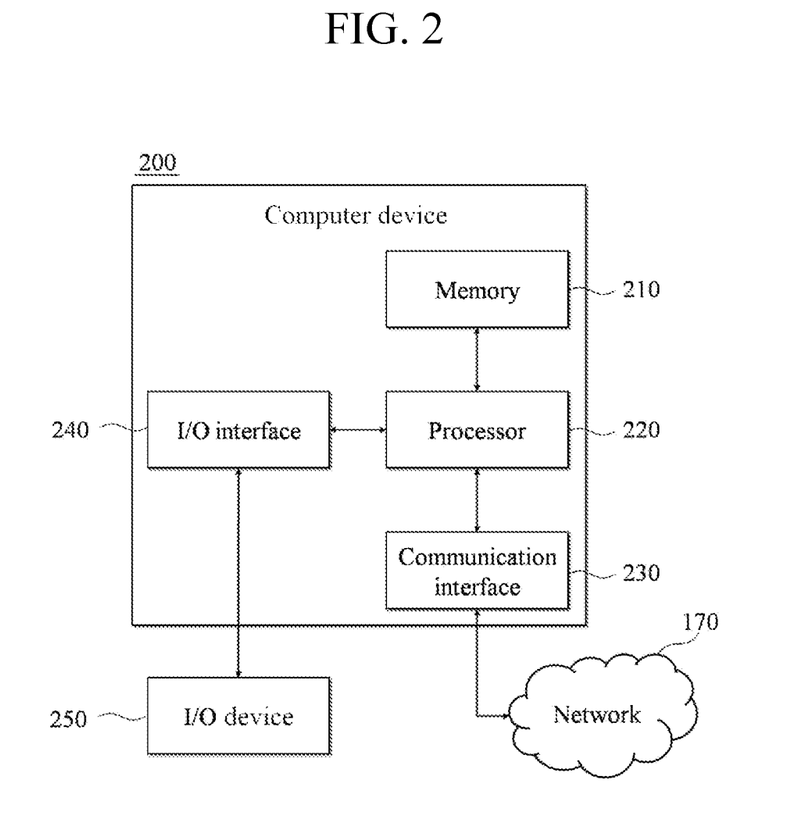
FIG. 2 is a block diagram illustrating an example of a computer device according to an embodiment of the present disclosure.

FIG. 2 is a block diagram illustrating an example of a computer device according to an embodiment of the present disclosure. Each of the plurality of electronic devices 110, 120, 130 and 140 or each of the servers 150 and 160 may be implemented by a computer device 200 illustrated in FIG. 2.

As illustrated in FIG. 2, the computer device 200 may include a memory 210, a processor 220, a communication interface 230, and an input/output (I/O) interface 240. The memory 210 is a computer-readable recording medium, and may include a permanent mass storage device, such as random access memory (RAM), read only memory (ROM), or a disk drive. In this case, a permanent mass storage device, such as ROM or a disk drive, may be included in the computer device 200 as a permanent storage device separate from the memory 210. Furthermore, an operating system and at least one program code may be stored in the memory 210. Such software elements may be loaded from a computer-readable recording medium, separate from the memory 210, to the memory 210. Such a separate computer-readable recording medium may include computer-readable recording media, such as a floppy drive, a disk, a tape, a DVD/CD-ROM drive, and a memory card. In another embodiment, software elements may be loaded onto the memory 210, not through a computer-readable recording medium but through the communication interface 230. For example, the software elements may be loaded onto the memory 210 of the computer device 200 based on a computer program installed by files received over the network 170.

The processor 220 may be configured to process instructions of a computer program by performing basic arithmetic operations, logic operations, and I/O operations. The instructions may be provided to the processor 220 by the memory 210 or the communication interface 230. For example, the processor 220 may be configured to execute received instructions based on a program code stored in a storage device, such as the memory 210.

The communication interface 230 may provide a function for enabling the computer device 200 to communicate with other devices (e.g., the aforementioned storage devices) over the network 170. For example, a request, an instruction, data or a file generated by the processor 220 of the computer device 200 based on a program code stored in a storage device, such as the memory 210, may be provided to other devices over the network 170 under the control of the communication interface 230. Inversely, a signal, an instruction, data or a file from another device may be received by the computer device 200 through the communication interface 230 of the computer device 200 over the network 170. The signal, instruction or data received through the communication interface 230 may be transmitted to the processor 220 or the memory 210. The file received through the communication interface 230 may be saved in a storage medium (i.e., the aforementioned permanent storage device) which may be further included in the computer device 200.

The input/output interface 240 may be a means for interfacing with an input/output device 250. For example, the input device of the input/output device 250 may include a device, such as a microphone, a keyboard, or a mouse, and the output device of the input/output device 250 may include a device, such as a display or a speaker. For another example, the input/output interface 240 may be a means for interfacing with a device whose functions for input and output are integrated into one, such as a touchscreen. The input/output device 250, together with the computer device 200, may be configured as a single device.

Furthermore, in other embodiments, the computer device 200 may include fewer or more elements than those in FIG. 2. For example, the computer device 200 may be implemented to include at least part of the input/output device 250 or may further include other elements, such as a transceiver and a database.

Figure 3:
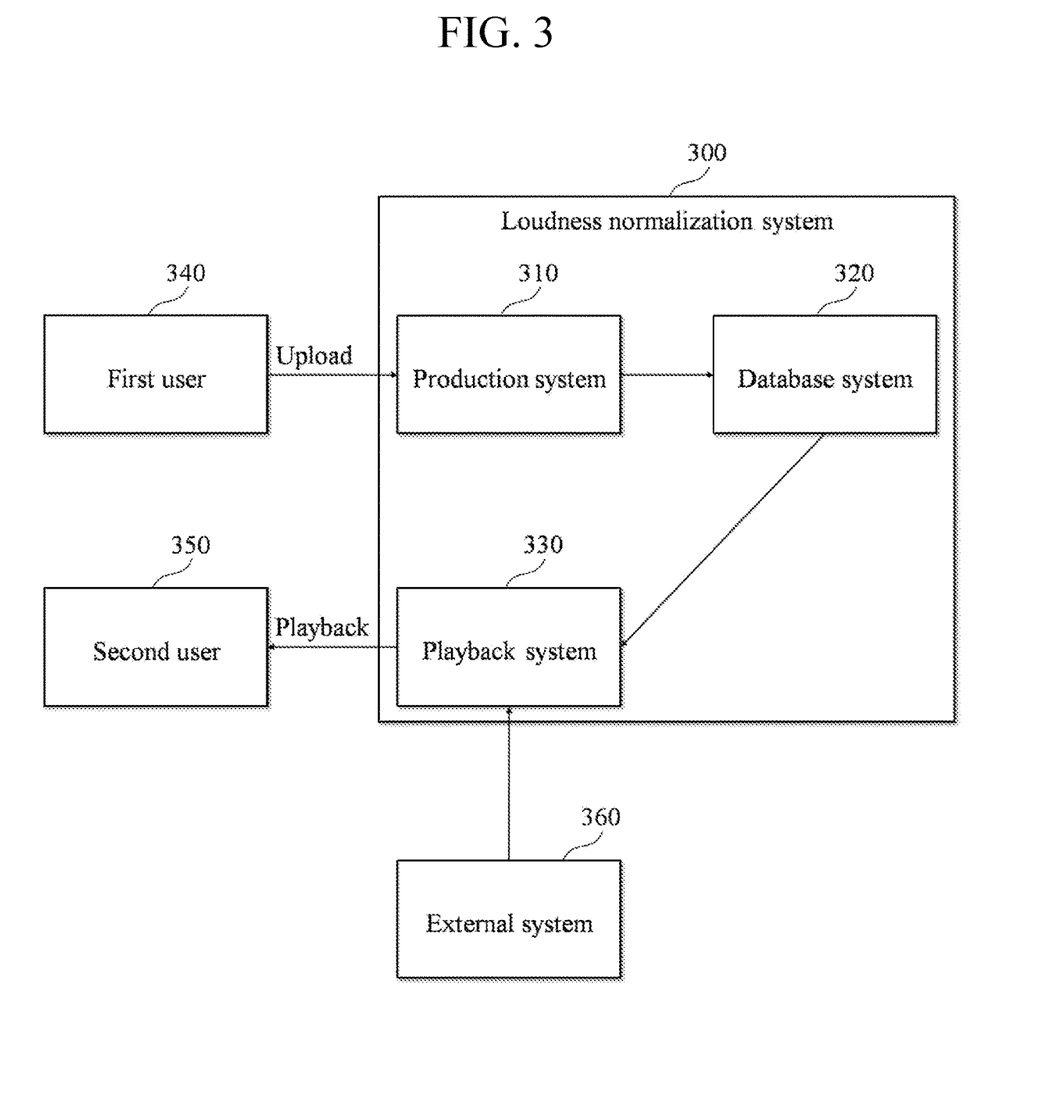
FIG. 3 is a diagram illustrating an example of a loudness normalization system according to an embodiment of the present disclosure.

FIG. 3 is a view illustrating an example of a loudness normalization system according to an embodiment of the present disclosure. The loudness normalization system 300 of FIG. 3 according to the embodiment may include a production system 310, a database system 320, and a playback system 330. Here, the production system 310 and the database system 320 may be included in a server implemented through at least one computer device 200. For example, the production system 310 and the database system 320 may be software modules implemented in a server under the control of a computer program installed on the server in order to provide content delivery service to clients. In some embodiments, the production system 310 and the database system 320 may be implemented in physically different server devices. The playback system 330 may be included in a terminal device of a second user 350 implemented through the computer device 200. For example, the playback system 330 may be a software module (e.g., a video player or an audio player) implemented on the terminal device of the second user 350 under the control of an application for content playback installed on the terminal device of the second user 350.

The production system 310 may obtain volume level metadata from content uploaded by a first user 340, and may deliver it to the database system 320 and store it in the database system 320. In this instance, data for playback of the uploaded content (e.g., video metadata for video content and a streaming file) also may be stored in the database system 320.

Afterwards, when the production system 330 plays back this content, the production system 330 may receive data for playback of this content (e.g., the aforementioned video metadata, streaming file, and volume level metadata) from the database system 320, and, in a process of preparing for playback of the content, may normalize the loudness of the content being played through a player provided in the terminal device of the second user 350 by adjusting the volume output level of the player by using the received volume level metadata. In other words, the volume level of the player may be automatically adjusted for playback of this content so as to bring the output loudness of the content to a proper level, without needing to transcode the content itself to change the volume level of the content. In this case, the second user 350 is able to hear audio of the content always at a normalized loudness, since the volume output level of the player is automatically adjusted for each content. Accordingly, the server is not required to transcode the content to adjust the volume level, but only extracts volume level metadata from the content and provides it, thereby reducing the transcoding cost and maintaining the dynamic band or the intention of the creator. Also, since the sound output level of the player is adjusted in the terminal device of the second user 350, it is possible to optimize to different volume levels according to the characteristics of various client environments (platforms, devices, sound output systems (e.g., speakers), etc.).

In some embodiments, the production system 330 may further include a function for normalizing the loudness of the content by extracting volume level metadata from external content (e.g., external advertisement content) delivered from an external system 360 without passing through the production system 310. Normalization of the loudness of such external content will be described below in further details.

Figure 4:
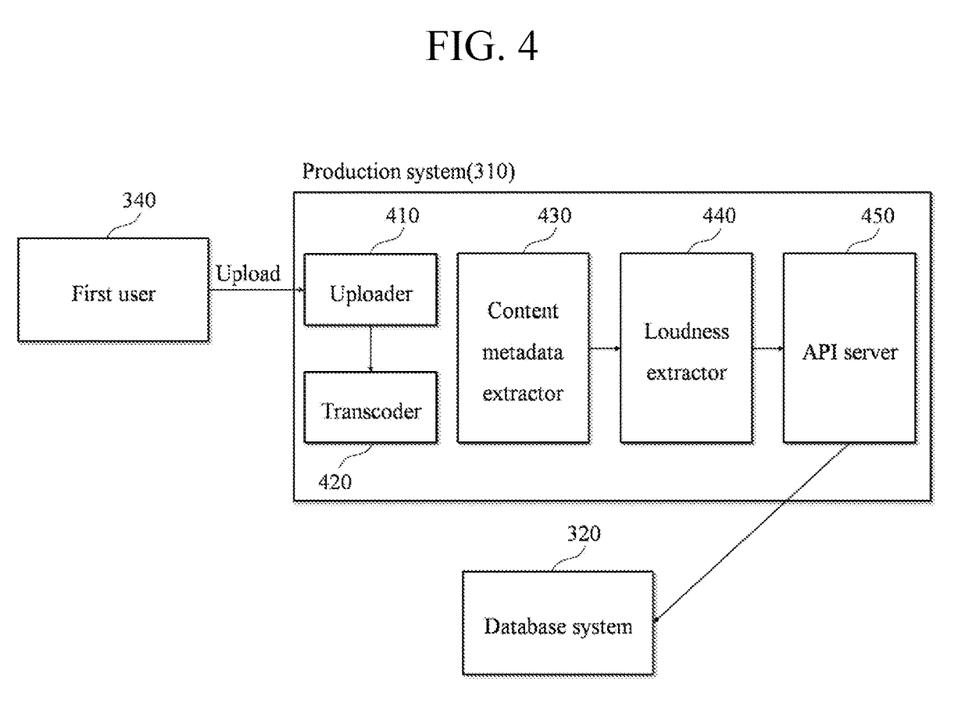
FIG. 4 is a block diagram illustrating an example of an internal configuration of a production system according to an embodiment of the present disclosure.

FIG. 4 is a block diagram illustrating an example of an internal configuration of the production system 310 according to an embodiment of the present disclosure. The production system 310 of FIG. 4 according to the embodiment may include an uploader 410, a transcoder 420, a content metadata extractor 430, a loudness extractor 440, and an API server 450.

When the first user 340 has a video uploaded on the production system 310, the uploader 410 may receive a file from a terminal device of the first user 340, and the transcoder 420 may transcode the received file. Once the transcoding is completed, the content metadata extractor 430 may extract content metadata (e.g., playback time, file size, FPS (frame per second), codecs, etc.) required for playback of the content. The loudness extractor 440 may separate an audio track from the content and measure the volume level for each segment of the audio, and create volume level metadata by structuring the measured volume level for each segment. In this instance, the content metadata extracted by the content metadata extractor 430 and the volume level metadata extracted by the loudness extractor 440 may be transmitted to the API server 450, together with a file of this content, and the API server 450 may transmit the content metadata, the volume level metadata, and the file for streaming the content to the database system 320 to be stored.

Figure 5:
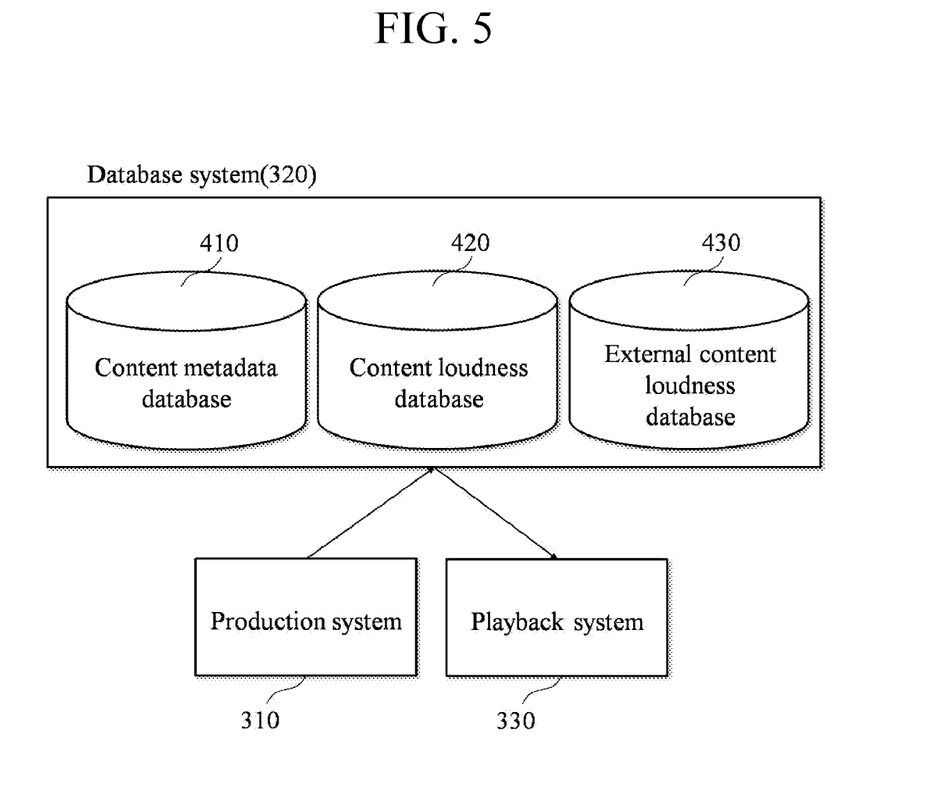
FIG. 5 is a block diagram illustrating an example of an internal configuration of a database system according to an embodiment of the present disclosure.

FIG. 5 is a block diagram illustrating an example of an internal configuration of the database system 320 according to an embodiment of the present disclosure. The database system 320 according to the embodiment of FIG. 5 may include a content metadata database 410 and a content loudness database 420, and, in some embodiments, may further include an external content loudness database 430.

The content metadata database 410 may store data required for playback of content (for example, content metadata and a file for streaming the content), and the content loudness database 420 may store volume level metadata of the content. For example, in relation to an identifier of specific content, data required for playback of the content and volume level metadata of the content may be stored in the database system 320.

In this instance, upon receiving a request for content of a specific identifier from the playback system 330, the database system 320 may transmit data required for playback of the content stored in relation to that identifier and volume level metadata to the playback system 330.

The external content loudness database 430 may store volume level metadata for external content received from the playback system 330 (i.e., content transmitted to the playback system 330 via the external system 360 explained with reference to FIG. 3 without passing through the production system 310). Such volume level metadata for external content may be created by the playback system 330 when the external content is initially played on the playback system 330, and be transmitted to the database system 320 and stored in the external content loudness database 430 of the database system 320. When the external content is played again on the playback system 330, the playback system 330 may play it using the volume level metadata through the external content loudness database 430 of the database system 320.

Figure 6:
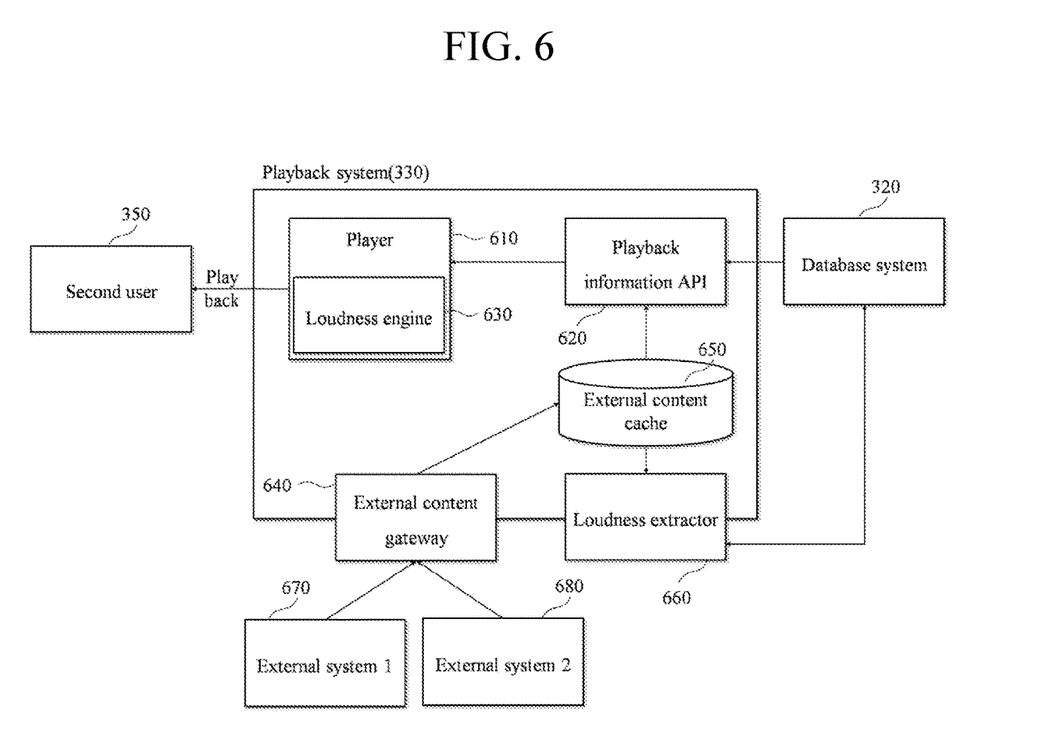
FIG. 6 is a block diagram illustrating an example of an internal configuration of a playback system according to an embodiment of the present disclosure.

FIG. 6 is a block diagram illustrating an example of an internal configuration of the playback system 330 according to an embodiment of the present disclosure. The playback system 330 of FIG. 6 according to the embodiment may include a player 610, a playback information API 620, and a loudness engine 630, and, in some embodiments, may optionally further include an external content gateway 640, an external content cache 650, and a loudness extractor 660.

Upon receiving a request for playback of certain content from the second user 350, the player 610 may retrieve information required for playback of this content from the database system 320 through the playback information API 620. For example, the playback system 330 may receive content metadata for this content and a streaming file and volume level metadata of the content from the database system 320 through an API call. At this time, the player 610 goes through a preparation process for playback by using the received content metadata and the receive streaming file of the content. In this case, the loudness engine 630 installed on the player 610 may normalize loudness by adjusting the volume output level of the player 610 by using the received volume level metadata, and the player 610 may provide the content to the second user 350 by playing the audio of the content based on the normalized loudness.

In some embodiments, external content may be played in relation to this content. For example, advertisement content may be played before, during, and/or after playback of video content. In this case, the player 610 may receive external content from an external system (for example, External System 1 670 and/or External System 2 680) via an external content gateway 640. Although FIG. 6 illustrates two external systems (External System 1 670 and/or External System 2 680), only one external system 360 or three or more external systems may be present as in the embodiment of FIG. 3.

The external content cache 650 may check for a playback history of received external content, and if there is a playback history, may receive volume level metadata for this external content from the database system 320 through the playback information API 620 and transmit it to the loudness engine 630 of the player 610. In this instance, the volume level metadata for the external content may be stored in the external content loudness database 430 explained with reference to FIG. 5. In this case, the loudness engine 630 may normalize the loudness of the external content by adjusting the volume output level of the player 610 based on the volume level of the external content. For new external content with no playback history, the external content cache 650 may directly extract the volume level metadata for the received external content through the loudness extractor 660, and store it in the database system 320. For example, the volume level metadata extracted from the external content may be stored in the external content loudness database 430 explained with reference to FIG. 5. Since the external content needs to be played also in the process of extracting the volume level metadata of the external content, the external content cache 650 may pass a mode value to the loudness engine 630 so that it operates as a client engine in a client mode, even without volume level metadata from the database system 320, which allows for adjusting volume level in any circumstances and therefore ensures service quality.

As described above with reference to FIG. 4, the loudness extractor 440 may measure the volume level for each segment of audio by separating an audio track from content, and create volume level metadata by structuring the measured volume level for each segment. Similarly, the loudness extractor 660 of FIG. 6 may measure the volume level for each segment of audio by separating an audio track from external content, and create volume level metadata by structuring the measured volume level for each segment.

More specifically, the loudness extractor 440 and/or the loudness extractor 660 may use a multi-band integrated loudness parameter, instead of a full-band integrated loudness parameter, as the volume level metadata. For example, it is assumed that content has aloudness of −24.7 LKFS (Loudness, K-weighted, relative to Full Scale) in the entire band. The multi-band integrated loudness parameter for this content may be obtained as in the following Table 1:

TABLE 1

| Band# | 0- | 1 | 2 | ... | 12 |
|---|---|---|---|---|---|
| Cut-off freq. | 50 | 100 | 150 | ... | 12,000 |
| Band LKFS | −35.7 | −28.3 | −15.4 | ... | −27.3 |

In this case, the standard output in the client (playback system 330) is (−35.7+−28.3+−15.4+ ... +−27.3)/13=−24.7 LKFS, and the integrated loudness may be calculated in the same manner as the existing full-band integrated loudness parameter. Using the multi-band integrated loudness parameter, loudness may be obtained by giving a weight for each band. For example, the integrated loudness may be calculated as in (0.1*−35.7+0.3*−28.3+0.7*−15.4+ ... +1.0*−27.3)/13=−30.5 LKFS, through equalizing or by giving different weights to different bands levels according to the characteristics of various client environments (platforms, devices, sound output systems (e.g., speakers), etc.). In this case, the volume level metadata may include a plurality of band-specific loudness values based on which the entire frequency band of the audio is divided into preset frequency ranges. In this instance, the loudness engine 630 may adjust the volume output level of the player 610 for each frequency band based on the loudness values for the different bands included in the volume level metadata.

Figure 7:
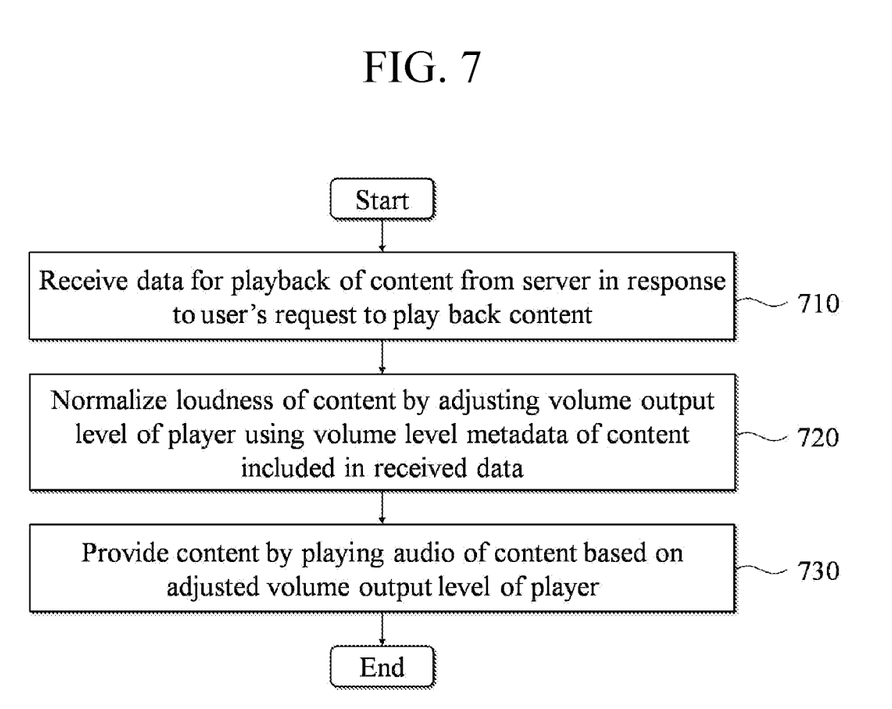
FIG. 7 is a flowchart illustrating an example of a loudness normalization method for a client according to an embodiment of the present disclosure.

FIG. 7 is a flowchart illustrating an example of a loudness normalization method for a client according to an embodiment of the present disclosure. The loudness normalization method according to this embodiment may be performed by a computer device 200 which implements a client that plays back content received from a server (for example, a streaming server). In this case, the processor 220 of the computer device 200 may be implemented to execute control instructions according to code of an operating system included in the memory 210 or code of at least one program. Here, the processor 220 may control the computer device 200 in response to a control command provided by the code stored in the computer device 200 in such a way that the computer device 200 performs the steps (710 to 730) included in the method of FIG. 7. Here, the at least one computer program may include an application (for example, a media player) for playing back content received from the server.

In step 710, the computer device 200 may receive data for playback of content from a server in response to a user's request for the content Here, the user may be the above-mentioned second user 350, and the server may be a system including the database system 320. The data for playback of content may include content metadata, a file of the content, and volume level metadata. An example in which the production system 310 extracts volume level metadata from the content has been described previously.

In step 720, the computer device 200 may normalize the loudness of the content by adjusting the volume level of the player by using the volume level metadata of the content included in the received data. For example, if the default loudness for the content is relatively high, the volume output level of the player may be decreased based on the volume level metadata, and, on the contrary, if the default loudness for the content is relatively low, the volume output level of the player may be increased based on the volume level metadata. Therefore, the user may receive content always at a normalized loudness.

In this instance, the volume level metadata may include a plurality of band-specific loudness values based on which the entire frequency band of the audio is divided into preset frequency ranges. In this case, in step 720, the computer device 200 may adjust the volume output level of the player for each frequency band based on the loudness values for the different bands included in the volume level metadata of the content. For example, the loudness for a specific frequency band may be increased or decreased according to the characteristics of the client's environment.

In step 730, the computer device 200 may provide the content by playing the audio of the content based on the adjusted volume output level of the player. Accordingly, even if the loudness is different for each content, the volume level of the player may be automatically adjusted based on the loudness varying with content by using the volume level metadata, thereby normalizing the loudness of content presented to the user. If the content is a video, the video may be played together with the audio through the player.

Figure 8:
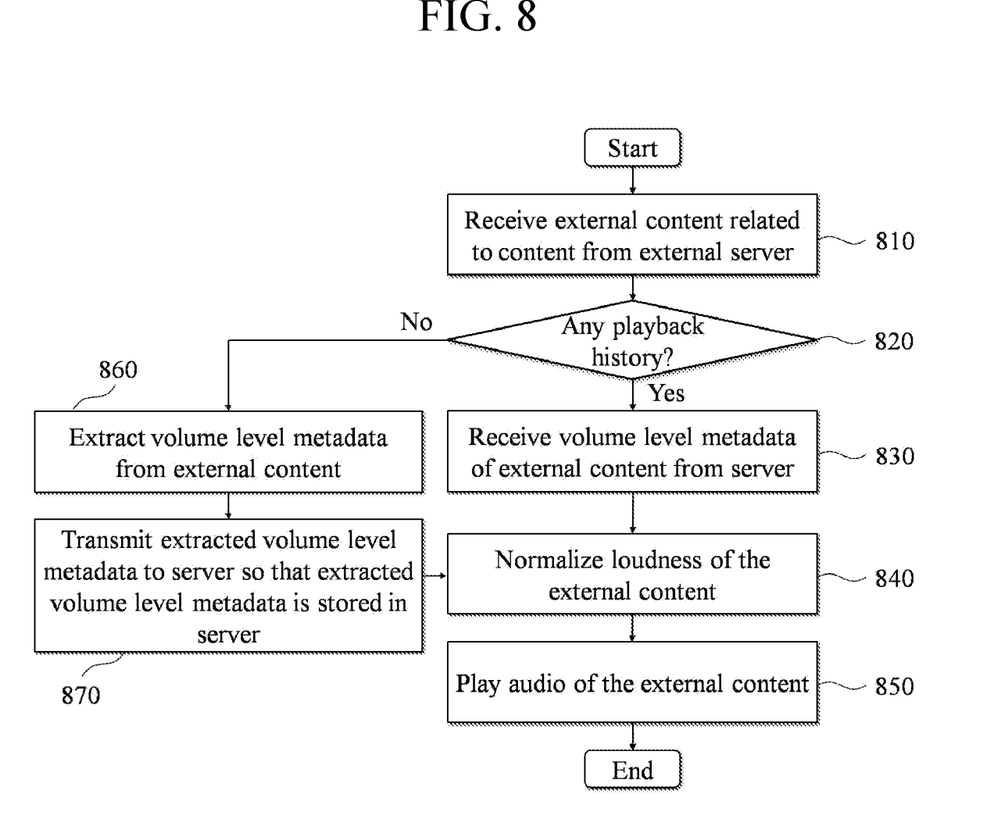
FIG. 8 is a flowchart illustrating an example of a process of processing external content on a client, in an embodiment of the present disclosure.

FIG. 8 is a flowchart illustrating an example of a process of processing external content on a client, in an embodiment of the present disclosure. The steps (810 to 870) of FIG. 8 may be performed between steps 710 and 720 of FIG. 7, during step 730, or after step 730. For example, if the external content is an advertisement that is played before playback of the content, the steps (810 to 870) of FIG. 8 may be performed between steps 710 and 720. For another example, if the external content is an advertisement that is played during playback of the content, the steps (810 to 870) of FIG. 8 may be performed during step 730. Lastly, if the external content is an advertisement that is played after playback of the content, the steps (810 to 870) of FIG. 8 may be performed after step 730.

In step 810, the computer device 200 may receive external content related to the content from an external server. Here, the external server may correspond to the above-described external system 360, External System 1 670, or External System 2 680. The external content related to the content may be an advertisement that is placed in relation to this content, for example, but is not limited thereto.

In step 820, the computer device 200 may determine whether or not there is a playback history of the external content. If there is a playback history of the external content, step 830 may be performed. Otherwise, if there is not playback history of the external content, step 860 may be performed.

In step 830, the computer device 200 may receive volume level metadata from a server. The volume level metadata may be information the computer device 200 extracted from the external content and transmitted to the server when it played the external content before.

In step 840, the computer device 200 may normalize the loudness of the external content. For example, the computer device 200 may normalize the loudness of the external content by adjusting the volume output level of the player using the volume level metadata of the external content received from the server.

In step 850, the computer device 200 may play the audio of the external content. If the content is a video, the video may be played together with the audio through the player.

In step 860, the computer device 200 may extract volume level metadata from the external content. In other words, the computer device 200 may extract volume level metadata by directly analyzing the external content if there is no playback history of the external content.

In step 870, the computer device 200 may transmit the extracted volume level metadata so that the extracted volume metadata is stored in the server. Accordingly, when the external content needs to be played again, the volume level metadata of the external content may be received from the server and used, without having to extract the volume level metadata from the external content, as in step 830.

In this case, in step 840, the computer device 200 may normalize the loudness of the external content by adjusting the volume output level of the player using the volume level metadata extracted in step 860. Afterwards, in step 850, the computer device 200 provide the audio of the external content by playing it based on the adjusted volume output level of the player. Likewise, if the content is a video, the video may be played together with the audio through the player.

Thus, the computer device 200 may normalize the loudness of the output content by adjusting the volume output level of the player based on the volume level metadata of the content intended to be played, without transcoding the content.

Figure 9:
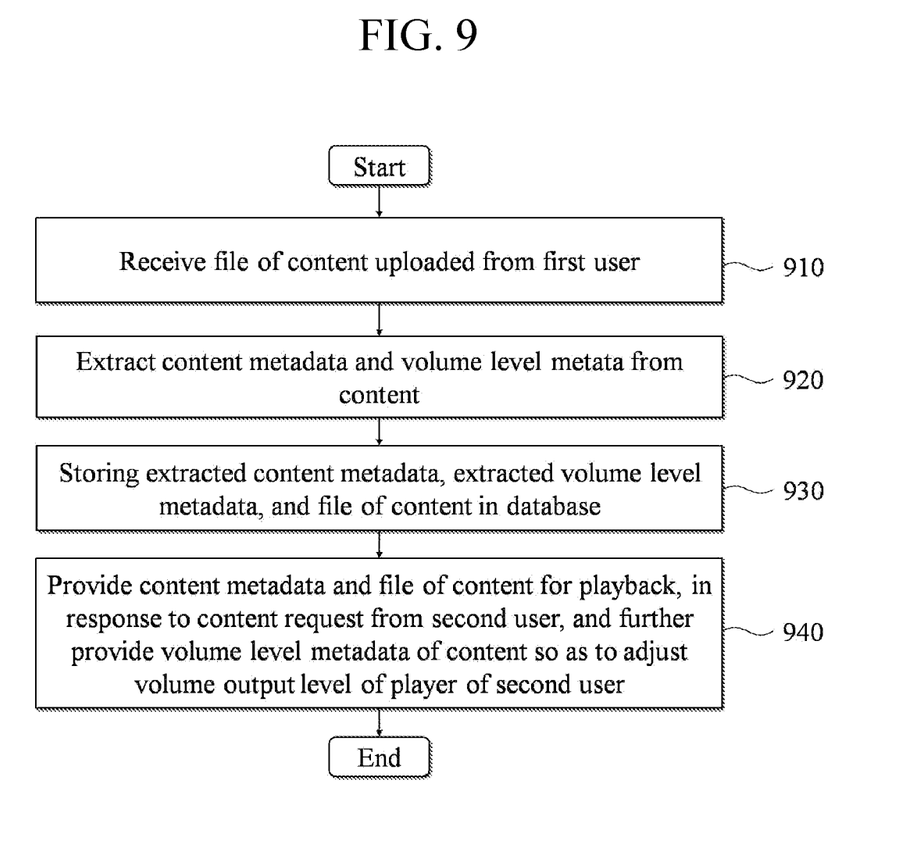
FIG. 9 is a flowchart illustrating an example of a loudness normalization method for a server according to an embodiment of the present disclosure.

FIG. 9 is a flowchart illustrating an example of a loudness normalization method for a server according to an embodiment of the present disclosure. The loudness normalization method according to this embodiment may be performed by a computer device 200 which implements a server (e.g., streaming server) that delivers content. In this case, the processor 220 of the computer device 200 may be implemented to execute control instructions according to code of an operating system included in the memory 210 or code of at least one program. Here, the processor 220 may control the computer device 200 in response to a control command provided by the code stored in the computer device 200 in such a way that the computer device 200 performs the steps (910 to 940) included in the method of FIG. 9.

In step 910, the computer device 200 may receive a file of the content uploaded from a first user. Here, the first user may correspond to the above-described first user 340.

In step 920, the computer device 200 may extract content metadata and volume level metadata from the content. An example in which the content metadata and the volume level metadata are extracted using the content metadata extractor 430 and the loudness extractor 440 has been described previously with reference to FIG. 4. For example, the computer device 200 may extract the volume level metadata in such a way as to include a plurality of band-specific loudness values for the content based on which the entire frequency band of the audio is divided into preset frequency ranges.

In step 930, the computer device 200 may store the extracted content metadata, the extracted volume level metadata, and the file of the content in a database. Here, the database may correspond to the database system 320. The database system 320 may be implemented to be included in the computer device 200, and in some embodiments, may be implemented in a separate physical device and communicate with the computer device 200 over the network 170.

In step 940, the computer device 200 may provide the content metadata and file of the content for playback, in response to a content request from a second user, and may further provide the volume level metadata of the content so as to adjust the volume output level of a player of the second user. As described previously, in a terminal device of the second user, loudness may be normalized since the volume output level of the player is adjusted using the volume level metadata of the content. If the volume level metadata includes a plurality of band-specific loudness values for the content, the volume output level of the player may be adjusted for each frequency band, based on the loudness values for the different bands included in the volume level metadata of the content.

Figure 10:
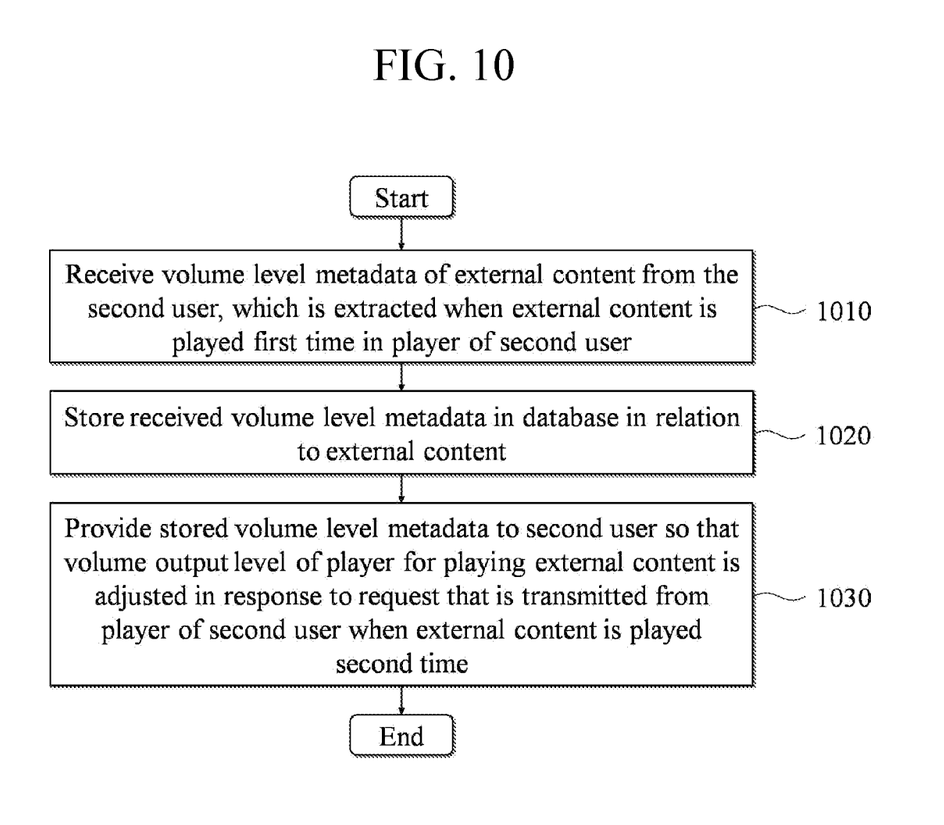
FIG. 10 is a flowchart illustrating an example of a process of processing external content on a client, in an embodiment of the present disclosure.

FIG. 10 is a flowchart illustrating an example of a process of processing external content on a client, in an embodiment of the present disclosure. The steps (1010 to 1030) of FIG. 10 may be performed by the computer device 200 which implements a server, when external content related to content is played in the player of the second user after step 940 of FIG. 9.

In step 1010, the computer device 200 may receive volume level metadata of external content from the second user, which is extracted when the external content is played the first time in the player of the second user.

In step 1020, the computer device 200 may store the received volume level metadata in the database in relation to the external content. These steps 1010 to 1020 may be performed as the player of the second player transmits the volume level metadata extracted from external content with no playback history to the computer device 200 when the external content is played in the player of the second player.

In step 1030, the computer device 200 may provide the stored volume level metadata to the second user so that the volume output level of the player for playing the external content is to be played is adjusted in response to a request that is transmitted from the player of the second user when the external content is played the second time. In other words, once volume level metadata is stored in the computer device 200, the volume output level of the player of the second user may be adjusted without needing to extract the volume level metadata for the same external content.

Thus, according to embodiments of the present disclosure, it is possible to play back content at a normalized loudness by optimizing the volume level of the content to a player for playing back the content, in a process of preparing for the playback of the content on a client. Therefore, there is no need for the server to adjust the volume of the content through transcoding, thereby preventing a reduction in dynamic band or a disruption of the original intention of the creator. Moreover, the cost incurred in transcoding the entire content over again may be avoided. In addition, it is possible to optimize to different volume levels according to the characteristics of various client environments (platforms, devices, sound output systems (speakers), etc.) in which the content is played back. Furthermore, volume level adjustment and control through transcoding are allowed for external content (e.g., advertisement content) which is streamed to a client from a system external to the server.

The system or device described above may be implemented in the form of a hardware component or a combination of a hardware component and a software component. For example, the system and components described in the embodiments may be implemented using one or more general-purpose computers or special-purpose computers, such as a processor, a controller, an arithmetic logic unit (ALU), a digital signal processor, a microcomputer, a filed programmable gate array (FPGA), a programmable logic unit (PLU), a microprocessor, or any other device capable of executing or responding to an instruction. A processor may run an operating system (OS) and one or more software applications executed on the OS. Furthermore, the processor may access, store, manipulate, process, and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction, or a combination of one or more of these and may configure a processor so that it operates as desired or may instruct the processor independently or collectively. The software and/or data may be embodied in a machine, component, physical device, virtual equipment, or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may independently or collectively include a program command, a data file, a data structure, and the like. The medium may continuously store a computer-readable program, or temporarily store the computer-readable program for execution or downloading. Further, the medium may be a variety of recording means or storage means in the form of a single hardware or a combination of a plurality of hardware, but is not limited to a medium directly connected to any computer system, but may be distributed on a network. Examples of the medium include a magnetic medium such as a hard disk, a floppy disk and a magnetic tape, an optical recording medium such as CD-ROM and DVD, a magneto-optical medium such as a floptical disk, ROM, RAM, flash memory, and the like such that program instructions are configured to be stored. Other examples of the medium may include a recording medium or a storage medium that is managed by an application store that distributes applications or a site, a server, etc. that supply or distribute various other software. Examples of the program instructions may include machine-language code, such as code written by a compiler, and high-level language code executable by a computer using an interpreter.

As described above, although the embodiments have been described in connection with the limited embodiments and the drawings, those skilled in the art may modify and change the embodiments in various ways from the description. For example, the relevant results may be achieved even when the described technologies are performed in a different order than the described methods, and/or even when the described components such as systems, structures, devices, and circuits are coupled or combined in a different form than the described methods or are replaced or substituted by other components or equivalents.

Therefore, other implementations, other embodiments, and equivalents to the claims are also within the scope of the following claims.

The invention claimed is:

1. A non-transitory computer-readable recording medium storing a computer program for enabling a computer device to execute aloudness normalization method, the method comprising:
    receiving data for playback of content from a system server in response to a user's request to play back the content;
    normalizing a loudness of the content by adjusting a volume output level of a player using volume level metadata of the content included in the received data;
    providing the content by playing audio of the content based on the adjusted volume output level of the player;
    receiving, from an external server, external content related to the content; and
    receiving volume level metadata of the external content from the system server in response to a determination that a playback history of the external content is present, and extracting volume level metadata from the external content to a determination that a playback history of the external content is absent,
    wherein the volume level metadata of the external content from the system server includes information that has been extracted from the external content while the external content was being played previously and transmitted to the system server.

2. The recording medium of claim 1, wherein the loudness normalization method further comprises:
    normalizing the loudness of the external content by adjusting the volume output level of the player using the received volume level metadata of the external content or the extracted volume level metadata from the external content; and
    providing the external content by playing audio of the external content based on the adjusted volumed output level of the player.

3. The recording medium of claim 1, wherein the volume level metadata of the content comprises a plurality of band-specific loudness values based on which the entire frequency band of the audio is divided into preset frequency ranges, and
    the normalizing of the loudness of the content comprises adjusting the volume output level of the player for each frequency band based on the loudness values for the different bands included in the volume level metadata of the content.

4. The recording medium of claim 2, wherein the volume level metadata of the external content comprises a plurality of band-specific loudness values based on which an entire frequency band of the audio is divided into preset frequency ranges, and
    the normalizing of the loudness of the external content comprises adjusting the volume output level of the player for each frequency band based on the loudness values for the different bands included in the volume level metadata of the external content.

5. A loudness normalization method executed by a computer device having at least one processor, the loudness normalization method comprising:
receiving data for playback of content from a system server in response to a user's request to play back the content;
normalizing a loudness of the content by adjusting a volume output level of a player using volume level metadata of the content included in the received data;
providing the content by playing audio of the content based on the adjusted volume output level of the player;
receiving, from an external server, external content related to the content; and
receiving volume level metadata of the external content from the system server in response to a determination that a playback history of the external content is present, and extracting volume level metadata from the external content to a determination that a playback history of the external content is absent,
wherein the volume level metadata of the external content from the system server includes information that has been extracted from the external content while the external content was being played previously and transmitted to the system server.

6. The loudness normalization method of claim 5, further comprising:
normalizing the loudness of the external content by adjusting the volume output level of the player using the received volume level metadata of the external content or the extracted volume level metadata from the external content; and
providing the external content by playing audio of the external content based on the adjusted volumed output level of the player.

7. A loudness normalization method executed by a computer device having at least one processor, the loudness normalization method comprising:
receiving a file of content uploaded from a first user;
extracting content metadata and volume level metadata from the content;
storing the extracted content metadata, the extracted volume level metadata, and the file of the content in a database;
providing, in response to a content request from a second user, the content metadata and file of the content for playback, and the volume level metadata of the content for enabling the volume output level of a player of the second user to be adjusted;
receiving volume level metadata of external content from the second user, the volume level metadata of the external content being extracted when the external content is played a first time in the player of the second user;
storing the received volume level metadata of the external content in the database in relation to the external content; and
providing the stored volume level metadata to the second user so that the volume output level of the player for playing the external content is adjusted in response to a request that is transmitted from the player of the second user when the external content is played a second time.

8. The loudness normalization method of claim 7, wherein the volume level metadata comprises a plurality of band-specific loudness values for the content based on which the entire frequency band of the audio is divided into preset frequency ranges.

9. A computer device for executing a loudness normalization method, comprising:
at least one processor configured to execute a computer-readable instruction, the at least one processor being configured to
receive a file of content uploaded from a first user,
extract content metadata and volume level metadata from the content,
store the extracted content metadata, the extracted volume level metadata, and the file of the content in a database,
provide, in response to a content request from a second user, the content metadata and file of the content for playback, and the volume level metadata of the content for enabling the volume output level of a player of the second user to be adjusted;
receive volume level metadata of external content from the second user, the volume level metadata being extracted when the external content is played a first time in the player of the second user;
store the received volume level metadata in the database in relation to the external content; and
provide the stored volume level metadata to the second user so that the volume output level of the player for playing the external content is adjusted in response to a request that is transmitted from the player of the second user when the external content is played a second time.

10. The computer device of claim 9, wherein the volume level metadata comprises a plurality of band-specific loudness values for the content based on which the entire frequency band of the audio is divided into preset frequency ranges.

* * * * *